Figure 1:
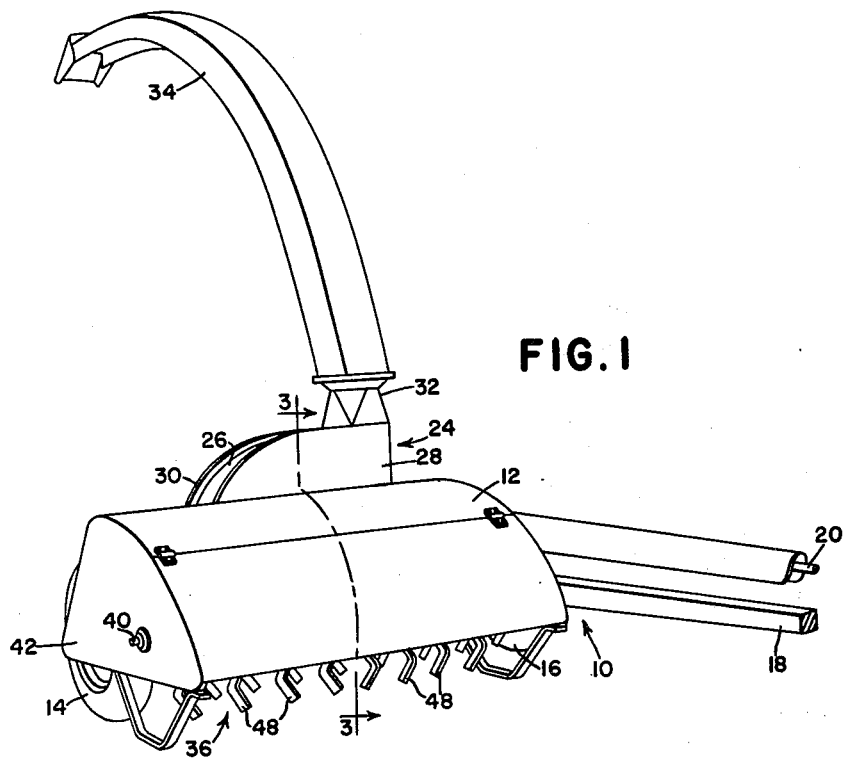

Feb. 9, 1960  G. L. MYERS  2,924,054
FORAGE HARVESTERS

Filed June 24, 1957  2 Sheets-Sheet 1

INVENTOR.
G. L. MYERS

Feb. 9, 1960 G. L. MYERS 2,924,054
FORAGE HARVESTERS

Filed June 24, 1957 2 Sheets-Sheet 2

INVENTOR.
G. L. MYERS

United States Patent Office 2,924,054
Patented Feb. 9, 1960

2,924,054
FORAGE HARVESTERS

Glenn L. Myers, Ottumwa, Iowa, assignor, by mesne assignments, to Deere & Company, a corporation of Delaware Application June 24, 1957, Serial No. 667,378

2 Claims. (Cl. 56—24)

This invention relates to a forage or similar harvester and more particularly to an improved harvester of the type including a rotary device that both chops and collects crops from the field over which the machine is operating.

A typical machine of the general character just referred to is shown in the patent to Lundell 2,758,435, the feature of which is the use of a rotary chopper that delivers rearwardly and upwardly beneath a generally semi-cylindrical hood so that crops are discharged into a transverse auger or equivalent conveyor for lateral transfer to a blower housing which ultimately discharges the crops to a trailing vehicle. In that machine, the crops are handled three times before they reach the trailing vehicle. In a subsequent Lundell Patent 2,786,317, the transverse conveyor as well as the blower housing are omitted and the theory of operation is that the rotary device will impel the crops rearwardly through a discharge spout, thus eliminating two handling devices.

Although the first-mentioned Lundell machine is commercially successful, the need exists for a relatively low-cost machine, and experience has shown that this need is not necessarily filled by the machine of the second Lundell patent, because in some crops, particularly in hay and similar crops, the rotary device alone does not have the neecssary mechanical efficiency to accomplish the cutting and collecting functions as well as the impelling or throwing function.

According to the present invention, an improved forage harvester is provided which incorporates direct delivery of the gathered and chopped crops to a blower housing which serves as a booster for impelling the crops ultimately rearwardly to the trailing vehicle. This machine has the advantage of eliminating an intermediate conveyor and at the same time furnishes enough mechanism for accomplishing the task that is not always accomplished by a machine of the direct-throw type. The invention features a design in which the machine entails simplicity of construction, relatively few moving parts, and utilization of known principles in the basic structure thereof, relying for novelty and utility on the rearrangement of the blower housing so that an intermediate conveyor is not necessary. The invention further features the utilization in the rotary device of laterally oppositely facing flails or cutter knives so that the chopped and gathered crop is caused to funnel rearwardly for facilitating delivery thereof to the inlet of the blower housing. As an adjunct to the knife or flail arrangement, the rotor housing includes baffle or deflector means implementing the funneling of crops to the blower housing.

The foregoing and other important objects and desirable features inherent in and encompassed by the invention will become apparent as a preferred embodiment thereof is disclosed in detail in the ensuing specification and accompanying sheets of drawings, the several figures of which are described immediately below.

Figure 2:
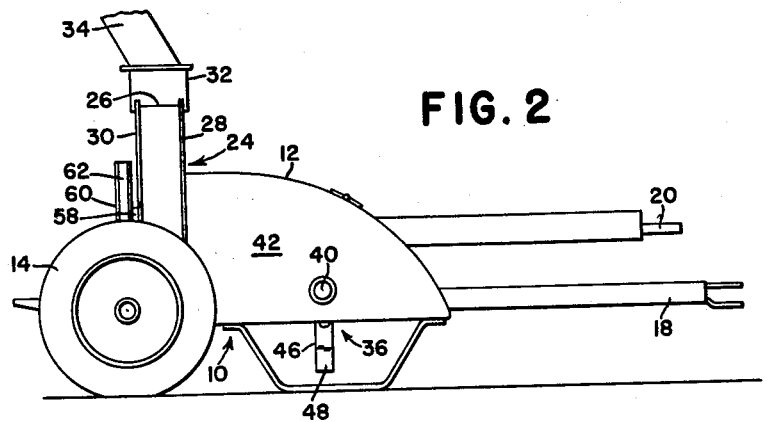
Figure 3:
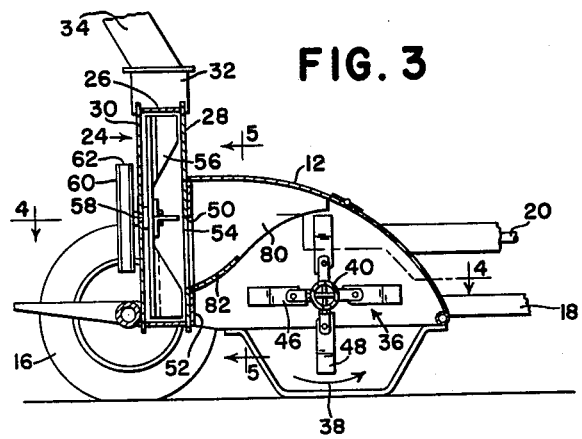
Figure 4:
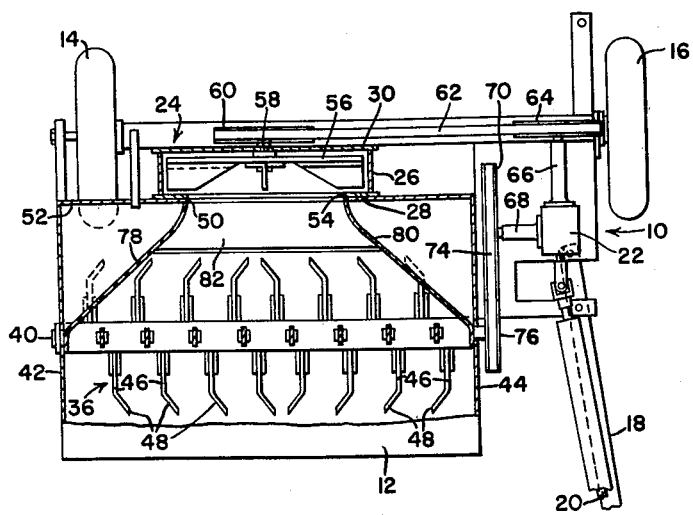
Figure 5:
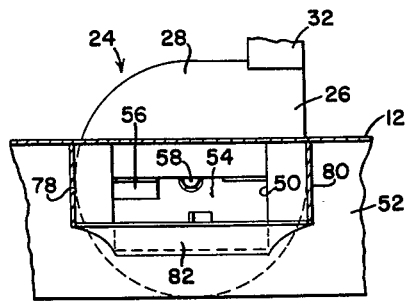

Fig. 1 is a perspective of the improved machine.
Fig. 2 is a side elevational view of the same.
Fig. 3 is a longitudinal section as seen generally along the line 3—3 of Fig. 1.
Fig. 4 is a transverse section as seen generally along the line 4—4 of Fig. 3.
Fig. 5 is a fragmentary section as seen along the line 5—5 of Fig. 3.

The basic structure has generally the appearance of the machines shown in the above-identified Lundell patents, although it is significantly different in arrangement and function. In general, the harvester represents a mobile crop gathering machine comprising frame means 10 including a generally semi-cylindrical casing 12 having its axis transverse and its concavity facing downwardly. The frame is carried on right and left hand ground wheels 14 and 16 and has a forwardly extending draft tongue 18 for connection to a tractor or similar propelling vehicle (not shown). A shielded propeller shaft 20 is adapted to be connected at its forward end to the usual power take-off shaft of the draft vehicle and extends rearwardly to a gear box 22 on the frame 10, from which gear box drive is taken to the moving parts of the machine, as will be detailed below. The frame also carries blower or booster means indicated in its entirety by the numeral 24. This means comprises a blower housing 26 having front and rear walls 28 and 30 respectively and defining with conventional components a tangential crop discharge outlet 32 which is typically augmented by a rearwardly directed spout 34.

The casing 12 contains a rotary chopping and gathering device 36 which rotates in the direction of the arrow 38 (Fig. 3) so as to cause crops to be chopped, gathered and impelled upwardly and rearwardly beneath the roof of the casing 12 for discharge to the blower means 24 which in turn discharges the crops through the outlet 32 and spout 34 to a trailing vehicle (not shown). The rotary device 36 comprises a transverse supporting shaft 40 appropriately journaled in the right and left hand end walls 42 and 44 of the casing 12, and this shaft carries a plurality of radially disposed flail-like elements or knives 46 which have outer end portions 48 adapted to chop and gather the crops. The direction of rotation of the device, as indicated by the previously described arrow 38, is such that as the outer end portions chop and gather crops at ground level or thereabove, said outer end portions travel in the same direction as the machine, whereby the chopped and gathered crops are impelled upwardly and rearwardly beneath the casing roof and through a rear discharge opening 50 in a transverse rear wall structural element 52 of the casing 12. The discharge opening 50 is in register with or crop-transfer relationship to an inlet opening 54 that is formed in the front radial wall 28 of the blower housing 26.

The blower means 24 has its fore-and-aft axis substantially centered on the median plane of the housing or casing 12 and further includes a rotor or blower 56, which may be of any conventional type. This rotor is journaled on the aforesaid fore-and-aft axis and rotates in the casing or housing 26 in such manner as to tangentially discharge crops through the discharge outlet 32 and spout 34. The rotor may be of any conventional construction and need not be further described.

The rotor is carried on a fore-and-aft driven shaft 58 on which is keyed a sheave 60 which is in turn driven by a belt 62 from a sheave 64 keyed to a rearwardly extending shaft 66 powered from the gear box 22. A laterally extending shaft 68, also driven by the gear box 22, carries a sheave 70 which is belted at 74 to a sheave 76 coaxially keyed to the left hand end of the rotor shaft 40.

From the description thus far, it will be seen that the rotary device 36 simply chops and gathers crops and delivers the crops to the blower housing 26 from which the blower rotor 56 expels these crops tangentially at 32—34, thus avoiding the use of an intermediate conveyor but at the same time establishing the blower means 24 as a pneumatic booster means for expediting the transfer of crops from the machine to the trailing vehicle, ensuring adequate power for the purpose and at the same time affording a relatively low-cost machine.

As best shown in Figs. 1 and 4, the blower means 24 is substantially centered on the fore-and-aft median plane of the casing 12, the axial length of which is substantially coincident with the axial length of the rotary device 36. As will be readily appreciated, this length is materially greater than the width of the inlet opening 54 in the blower means 24, so that the side or end walls 42 and 44 of the casing 12 are laterally outwardly of the respective opposite edges of the inlet opening. In order to avoid the use of a blower means of excessive size, the present invention features means for narrowing the crop stream, or funneling the crop stream, rearwardly to change from the considerable axial width of the device 36 to the relatively narrow width of the inlet opening 54. This means preferably comprises a pair of shields 78 and 80 which converge rearwardly respectively from the inner faces of the casing end walls 42 and 44 to opposite marginal edges of the crop-transfer means or opening 50—54. As best shown in Fig. 3, the under edges of these shields or baffles are curved to accommodate the rotary device 36. A transverse bottom plate 82 cross-connects the rear portions of the shields 78 and 80 and extends downwardly and rearwardly to the lower marginal edge of the crop transfer opening 50—54, thus facilitating the crop transfer and preventing crops from returning to the ground as they leave the rotary device 36.

The funneling or narrowing of the crop stream, as achieved by the interior wall means comprising the parts 76, 80 and 82 and the under surface of the rear part of the top of the casing 12, is further implemented by the construction and arrangement of the flail-like elements or knives 46. Fig. 4 best illustrates this feature, wherein it will be seen that the outer end portions 48 of the knives or elements to the right of the fore-and-aft median plane are inclined laterally inwardly, whereas the outer end portions of the knives or elements to the left of this median plane are inclined oppositely laterally inwardly. The oblique arrangement of the knives thus causes the crops to be thrown inwardly from opposite ends of the rotary device and this, particularly in combination with the deflectors or baffles 78 and 80, accomplishes the necessary funneling or narrowing action. The opposite obliqueness of the outer end portions 48 is also readily apparent in Fig. 1.

In summary, it will be noted that the basic features of the invention are the direct transfer from the rotary device 36 to the blower means 24, as augmented by the shield means 78—80 and the laterally oppositely inwardly turned outer end portions 48 of the knives or flail-like elements 46. These features combine to enable the production of a simple and economical machine and one that has adequate power for handling most crops. The use of the blower means 24 is an improvement over a direct-throw machine in that it adds a booster for handling heavy crop and this enables better distribution of the crop in the trailing vehicle, avoiding the necessity for an additional operator to level the load to prevent spilling thereof before the vehicle is full. The distinct advantage over a heavy duty machine such as disclosed in the first-mentioned Lundell patent is that the intermediate conveyor or auger is omitted.

Features and advantages in addition to those above enumerated will readily occur to those versed in the art, as will many modifications and alterations in the preferred embodiment of the invention disclosed, all of which may be achieved without departure from the spirit and scope of the invention.

What is claimed is:

1. A mobile crop-gathering machine, comprising: frame means including a transverse elongated axle member having wheels at its opposite ends, said frame means further including a generally semicylindrical casing disposed transversely to the line of travel and ahead of the axle member and having its concavity facing downwardly, said casing having widely spaced apart opposite fore-and-aft end walls, a generally upright rear wall spanning the end walls and spaced closely ahead of the axle and a top wall extending across between the end walls and back to said rear wall, said rear wall having a discharge opening of materially smaller width than the spacing between said end walls and said opening being substantially centered on the fore-and-aft median plane of the machine; a rotating chopping and gathering device journaled in and generally coaxial with the casing and generally coextensive in width with said casing and having a plurality of radially disposed flail-like elements including outer end portions for chopping and gathering crops, the direction of rotation of said device being such that when chopping and gathering crops at ground level or thereabove the outer end portions of the elements travel in the same direction as the machine whereby the chopped and gathered crops are impelled upwardly and rearwardly beneath the casing top wall to be thrown directly to said discharge opening; shield means carried by and within the casing including a pair of deflectors disposed in depending relation to the top wall and diverging forwardly from the discharge opening to meet the respective end walls generally above the axis of the chopping and gathering device, said deflectors having forward end portions reduced in vertical dimension to afford radial clearance for the respective endmost flail-like elements and said shield means and the portion of the top wall therebetween cooperating to funnel crops directly to the discharge opening; and blower means on the frame directly rearwardly of the casing and including a generally circular housing on a fore-and-aft axis and disposed in the space between the axle member and the casing rear wall, said casing having a front wall formed with a crop inlet opening in direct and immediate crop-transfer relation to the casing discharge opening for directly receiving casing-discharged crops, said housing having a generally tangential crop outlet, and said blower means including a rotor substantially coaxially contained in the housing for expelling housing-received crops through said outlet.

2. A mobile crop-gathering machine, comprising: frame means including a generally semicylindrical casing disposed transversely to the line of travel and having its concavity facing downwardly, said casing having widely spaced apart opposite fore-and-aft end walls, a generally upright rear wall spanning the end walls and a top wall extending across between the end walls and back to said rear wall, said rear wall having a discharge opening of materially smaller width than the spacing between said end walls and said opening being substantially centered on the fore-and-aft median plane of the machine; a rotating chopping and gathering device journaled in and generally coaxial with the casing and generally coextensive in width with said casing and having a plurality of radially disposed flail-like elements including outer end portions for chopping and gathering crops, the direction of rotation of said device being such that when chopping and gathering crops at ground level or thereabove the outer end portions of the elements travel in the same direction as the machine whereby the chopped and gathered crops are impelled upwardly and rearwardly beneath the casing top wall to be thrown directly to said discharge opening; shield means carried by and within the casing including a pair of deflectors disposed in depending relation to the top wall and diverging forwardly from the discharge opening to meet the respective end walls generally above the axis of the chopping and gathering device, said deflectors having forward end portions reduced in vertical dimension to afford radial clearance for the respective endmost flail-like elements and said shield means and the portion of the top wall therebetween cooperating to funnel crops directly to the discharge opening; and blower means on the frame directly rearwardly of the casing and including a generally circular housing on a fore-and-aft axis and having a front wall formed with a crop inlet opening in direct and immediate crop-transfer relation to the casing discharge opening for directly receiving casing-discharged crops, said housing having a generally tangential crop outlet, and said blower means including a rotor substantially coaxially contained in the housing for expelling housing-received crops through said outlet.

References Cited in the file of this patent

UNITED STATES PATENTS

| | | |
|---|---|---|
| 1,297,349 | Herr | Mar 18, 1919 |
| 2,493,918 | Hill | Jan. 10, 1950 |
| 2,786,317 | Lundell | Mar. 26, 1957 |
| 2,803,101 | Lundell | Aug. 20, 1957 |
| 2,836,022 | Caldwell | May 27, 1958 |
| 2,841,946 | Skromme et al. | July 8, 1958 |